United States Patent
Bellido-Gonzalez et al.

(10) Patent No.: US 10,168,672 B2
(45) Date of Patent: Jan. 1, 2019

(54) AUTO-TUNING

(71) Applicant: Gencoa Ltd., Merseyside (GB)

(72) Inventors: Victor Bellido-Gonzalez, Merseyside (GB); Dermot Patrick Monaghan, Merseyside (GB); Joseph Brindley, Merseyside (GB); Benoit Daniel, Merseyside (GB)

(73) Assignee: GENCOA LTD., Liverpool (Merseyside) (GB)

( * ) Notice: Subject to any disclaimer, the term of this patent is extended or adjusted under 35 U.S.C. 154(b) by 371 days.

(21) Appl. No.: 14/785,585

(22) PCT Filed: Apr. 17, 2014

(86) PCT No.: PCT/GB2014/051216
§ 371 (c)(1),
(2) Date: Oct. 19, 2015

(87) PCT Pub. No.: WO2014/170687
PCT Pub. Date: Oct. 23, 2014

(65) Prior Publication Data
US 2017/0060106 A1   Mar. 2, 2017

(30) Foreign Application Priority Data

Apr. 17, 2013 (GB) .................................. 1306923.2

(51) Int. Cl.
*G05B 11/42* (2006.01)
*G05B 13/04* (2006.01)
*G05B 13/02* (2006.01)

(52) U.S. Cl.
CPC ............ *G05B 13/041* (2013.01); *G05B 11/42* (2013.01); *G05B 13/024* (2013.01)

(58) Field of Classification Search
CPC ..... G05B 11/42; G05B 13/024; G05B 13/041
See application file for complete search history.

(56) References Cited

U.S. PATENT DOCUMENTS

| | | | | |
|---|---|---|---|---|
| 4,509,125 A | * | 4/1985 | Fattic | B60W 30/18 474/11 |
| 4,957,605 A | * | 9/1990 | Hurwitt | C23C 14/04 204/192.12 |
| 5,369,253 A | * | 11/1994 | Kuwata | F24C 7/087 219/400 |
| 5,716,032 A | * | 2/1998 | McIngvale | B64C 39/024 244/185 |

(Continued)

OTHER PUBLICATIONS

International Search Report for PCT/GB2014/051216 dated Sep. 24, 2014.

*Primary Examiner* — Kenneth M Lo
*Assistant Examiner* — Mohammad A Rahman
(74) *Attorney, Agent, or Firm* — TannerIP PLLC; Daniel A. Tanner, III; James E. Golladay, II

(57) ABSTRACT

A method is provided for automated tuning and calibration of feedback control of systems and processes. A series of actuator pulses are automatically performed and, based on the gradient of the sensor response, information is determined on the dynamics of the system to be controlled in what is described as the system identification procedure. An automatic sensor calibration procedure is performed to determine the controller's window of operation. Based on the information collected during the system identification procedure, controller parameters are automatically calculated for a specified time for the sensor to reach a setpoint. A system that is managed and/or controlled by a controller and/or control algorithm is also provided. The disclosed method provides a scheme for parameterization of control algorithms.

19 Claims, 7 Drawing Sheets

(56) References Cited

U.S. PATENT DOCUMENTS

| | | | | |
|---|---|---|---|---|
| 5,918,951 | A * | 7/1999 | Rudd, III | B60T 8/1703 |
| | | | | 188/181 T |
| 6,428,140 | B1 * | 8/2002 | Cruz-Uribe | B41J 2/14201 |
| | | | | 347/20 |
| 6,697,388 | B1 * | 2/2004 | Broutin | H01S 5/042 |
| | | | | 372/20 |
| 8,344,667 | B1 * | 1/2013 | King | H05B 37/02 |
| | | | | 315/186 |
| 8,613,245 | B1 * | 12/2013 | Lassota | A47J 31/002 |
| | | | | 426/433 |
| 8,730,040 | B2 * | 5/2014 | Donovan | G08B 13/19645 |
| | | | | 340/506 |
| 2003/0171854 | A1 | 9/2003 | Pillar et al. | |
| 2007/0156363 | A1 | 7/2007 | Stewart et al. | |
| 2008/0039969 | A1 * | 2/2008 | Liu | B22D 17/32 |
| | | | | 700/197 |
| 2009/0236452 | A1 * | 9/2009 | Bolognesi | A47J 31/404 |
| | | | | 241/30 |

\* cited by examiner

AUTO-TUNING

This invention relates to improvements in and relating to feedback control, and in particular, but without limitation, to the feedback control of systems and processes. Embodiments of this invention also relate to the calibration and parameterisation of the control systems used for such applications and/or to the identification of system and process dynamics.

Control systems are commonly used to regulate and control systems and processes. Control systems typically comprise sensors and actuators whereby actuator inputs lead to changes that are detected by the sensors. In almost all cases, there is a non-linear relationship between actuator input and sensor outputs, which can be attributed to a wide range of system variables, such as the speed of the actuators, the responsiveness or resolution of the sensors, time lags, mechanics, inertia etc., as will be well-understood by persons skilled in the art.

As such, almost all control systems require certain parameters contained in the control algorithm to be adjusted in order to meet performance specifications. Control algorithm parameters are generally manually adjusted because a real-world situations or real experimental environments, in many cases, cannot be fully modelled and simulated. The present invention provides a method of automatically adjusting controller parameters to meet specified performance characteristics.

This invention is relevant to feedback control systems generally. However, the invention is particularly useful in the field of vacuum deposition systems whereby modelling of all of the possible process parameters (which would be necessary to obtain a self-contained control system not requiring calibration), is particularly difficult.

According to a first aspect of the invention, there is provided a series of actuator actions that are automatically performed and, based on the sensor response, information is determined on the dynamics of the system to be controlled (this will be known as the system identification procedure). This is preceded by an automatic sensor calibration procedure in order to determine the controller's window of operation. Based on this information controller parameters are automatically calculated for a specified dynamic response.

A second aspect of the invention provides a method of automatically calculating controller parameters comprising the steps of: an automatic sensor calibration procedure to determine the controller's window of operation; automatically performing a series of actuator actions and, based on the sensor response; a system identification procedure for determining information on the dynamics of the system to be controlled; and automatically calculating the controller parameters for a specified dynamic response based on the calibration and system identification procedures.

A third aspect of the invention provides a method for automatically calculating the controller parameters required to obtain a specified dynamic response in a system comprising a controller operatively connected to a sensor and an actuator, whereby the sensor output depends on an actuator input, the method comprising: an automatic sensor calibration procedure to determine maximum (1) and minimum (2) sensor levels, the automatic sensor calibration procedure comprising: performing a series of first actuator ramps (4) and recording the sensor responses (3); determining the maximum (1) and minimum (2) sensor values recoded during the first actuator ramping (4); recording an actuator value (5) corresponding to the minimum sensor value (2); recording an actuator value (6) corresponding to the maximum sensor value (1); determining a window of operation of the controller being the range of actuator values falling between the actuator value (5) corresponding to the minimum sensor value (2) and the actuator value (6) corresponding to the maximum sensor value (1); a system identification procedure to determine the dynamic response characteristics of the system, the system identification procedure comprising: selecting an actuator value (u0) falling within the window of operation of the controller; performing a second actuator ramping (3) about the selected actuator value (u0); analysing the sensor response (2) by recording the gradient of the sensor response (dy/dt) at an actuator value (Δu) offset from u0; and determining a relationship (B) that is characteristic of a dynamic system parameter where B=f(dy/dt, Δu).

Suitably, the method further comprises determining an average value for B for a plurality of the actuator values (Δu) offset from the selected actuator value (u0).

The method may further comprise the step of calculating the optimum controller parameters (K) for a specified time to setpoint (tts), the time to the setpoint (tts) being the time from the onset of an initial actuator input to a point whereby the sensor output reaches the setpoint.

Initially, a default time to setpoint (tts) value may be used, and after having performed the auto-tuning method, the optimum controller parameters (K) can be calculated by the function K=g(B, tts).

Suitably:

$$B = dy/dt/\Delta u \quad (1)$$

$$K = \text{vector}(K1, K2), \text{ where} \quad (2)$$

$$K1 = 2 \times (\text{Damping Ratio}) \times (1.8/tts) \times (1/B); \text{ and} \quad (3)$$

$$K2 = (1.8/tts)^2 \times (1/B) \quad (4)$$

$$K = g \times (1/B); \text{ where} \quad (5)$$

$$g = \text{vector}(2 \times (\text{Damping Ratio}) \times (1.8/tts)^2) \quad (6)$$

The default time to setpoint can be arbitrary. However, it is preferred to use a calculated default tts, which is a function of the phase difference in the actuator's action and the sensor's response. The phase difference can be calculated by identifying the points of inflection in the actuator and sensor data curves and calculating the time lag between the points of inflection. Thus, the default tts can be n×the phase difference (in seconds), and preferably 3×the phase difference (in seconds). By using a calculated default tts, this safeguards the system against instability which may arise if the default tts value, or arbitrary tts value, is too low.

The function g is suitably selected according to a control algorithm used by the controller, and wherein the control algorithm comprises any one or more of the group comprising: a proportional (P) control algorithm; a proportional integrating (PI) control algorithm; a proportional-integral-derivative (PID) control algorithm, or a proportional-derivative-feedback (PDF) control algorithm.

Whilst the period of the first ramping can be of any duration, a ramping period of substantially 1 minute may be used. Likewise, whilst the period the second ramping may be of any duration, it may be approximately 10 seconds.

The maximum (1) and minimum (2) sensor values are suitably obtained by integrating or averaging the highest or lowest sensor values recorded in an interval of time.

The maximum (1) and minimum (2) sensor values are suitably automatically identified and recorded wherein the sensor values are scaled such that the maximum value (1) is represented as a 100% sensor value and the minimum value (2) is represented as 0% sensor value.

The first and/or second ramping may comprise any one or more of the group comprising: triangular pulses; square stepped pulses (1); saw toothed pulses (2); square pulses (3); and a constant signal.

The second ramping may comprise ramping using a series of sequential pulses at different mean amplitudes and wherein the optimum controller parameters are calculated for the different mean amplitudes, and wherein the controller is configured to interpolate optimum controller gains for a complete range of possible setpoints.

The pulse duration and amplitude may be automatically selected depending on the type of sensor, system, actuator or process.

A fourth aspect of the invention provides any one or more of the group comprising: a plasma deposition treatment method; a non-plasma deposition and treatment method; a plasma vacuum method; a reactive magnetron sputtering method; a non-reactive magnetron sputtering method; a plasma assisted chemical vapour deposition method; a cathodic arc ion assisted deposition method; a high-power impulse magnetron sputtering (HIPIMS) method; and a coating or deposition method, any or all of which being controlled by a controller in which the controller parameters are automatically calculated to obtain a specified dynamic response according to the invention.

The controller is suitably adapted to regulate the rate, composition and uniformity of deposition.

The actuator is suitably used to control any one or more of the group comprising: a flow of a process gas; a voltage; a current; a voltage frequency; a voltage amplitude; a current frequency; a current amplitude; gas or fluid injection flow rate; chemical injection; particle injection; an electric motor; a linear actuator; a pneumatic actuator and a valve.

The sensor is suitably used to measure, either directly or indirectly, the rate of deposition.

The sensor may comprise any one or more of the group comprising: a target voltage sensor; a plasma light emission sensor; a pressure sensor; an oxygen partial pressure sensor; and a hydrogen sensor; an optical emission sensor; a spectral CCD; a partial pressure sensor; and a Lambda sensor.

A graphical user interface may be employed for the controller adapted to implement the method of the invention. The GUI may be adapted to enable a user to set a time to setpoint comprising a slider or text input box for user-selection of a desired time to setpoint, whereby when the tts is changed, the controller parameters are automatically re-calculated using function g.

A further aspect of the invention provides a system controlled by the method of any preceding claim, wherein the system comprises any one or more of the group comprising: a power generation apparatus; a wind turbine; a hydroelectric turbine; a tidal current turbine; a motor that when actuated intervenes in electrical power generation; a power conversion system; an aerodynamic system; an energy grid; an energy management system; a photovoltaic energy production and management system; and an energy storage system.

The present invention relates to any system that is managed and/or controlled by a controller and/or control algorithm. The present system relates to analogue, digital or mixed control analogue/digital systems.

The present invention also relates to control of power generation elements such as wind turbine, hydro turbine, tidal current turbine, and any motor that when actuated intervenes in electrical power generation.

The present invention also relates to the control of power conversion systems.

The present invention also relates to control of elements by use of power, such as electrical power, thermal power, combustion power, nuclear power and any combination of power.

The present invention also relates to the control of aerodynamic systems.

The present invention also relates to the control of energy grids.

The present invention also relates to energy management systems, such as those of a building.

The present invention also relates to photovoltaic energy production and management.

The present invention also relates to any energy storage method, such as batteries, redox cells, molten salts, gravity, flying wheels, superconductors, and any combination of energy storage systems.

The present invention refers to plasma and non-plasma deposition and treatment methods. The present invention also refers to control systems and processes related to plasma vacuum and non-vacuum applications, e.g. reactive and non-reactive magnetron sputtering, plasma assisted chemical vapour deposition, cathodic arc ion assisted deposition, HIPIMS and any coating or deposition method.

The present invention relates to any sputtering process where a control system is used to regulate the rate, composition and uniformity of deposition. For example reactive sputtering processes where the flow of a reactive gas, such as oxygen or nitrogen, is regulated by a control system.

The present invention relates to the use of the present method for control of sputtering systems with any target material, for example, aluminium, titanium, silver etc.

The present invention relates to any sputtering systems where a sensor is used to measure, either directly or indirectly, the rate of deposition, for example target voltage sensors, plasma light emission sensors, oxygen partial pressure sensors, hydrogen sensors, or any relevant element sensor.

The present invention also refers to any type of actuator and sensor based feedback control system. For example, control systems with wind speed sensors, angular rotation position and speed sensors, temperature sensors, light intensity sensors, voltage or current sensors and pressure sensors. Examples of control system actuators include, but are not limited to; voltage or current amplitude or frequency signals, gas or fluid injection flow rates, chemical injection, particle injection and all electro-mechanical actuation devices, e.g. electric motors, linear actuators, pneumatic actuators and valves.

The present invention relates to the use of the present method for parameterisation of any control algorithm, for example, PID, PI, P, PDF.

The invention will be further described by way of example only with reference to the following figures in which.

Figure 1:
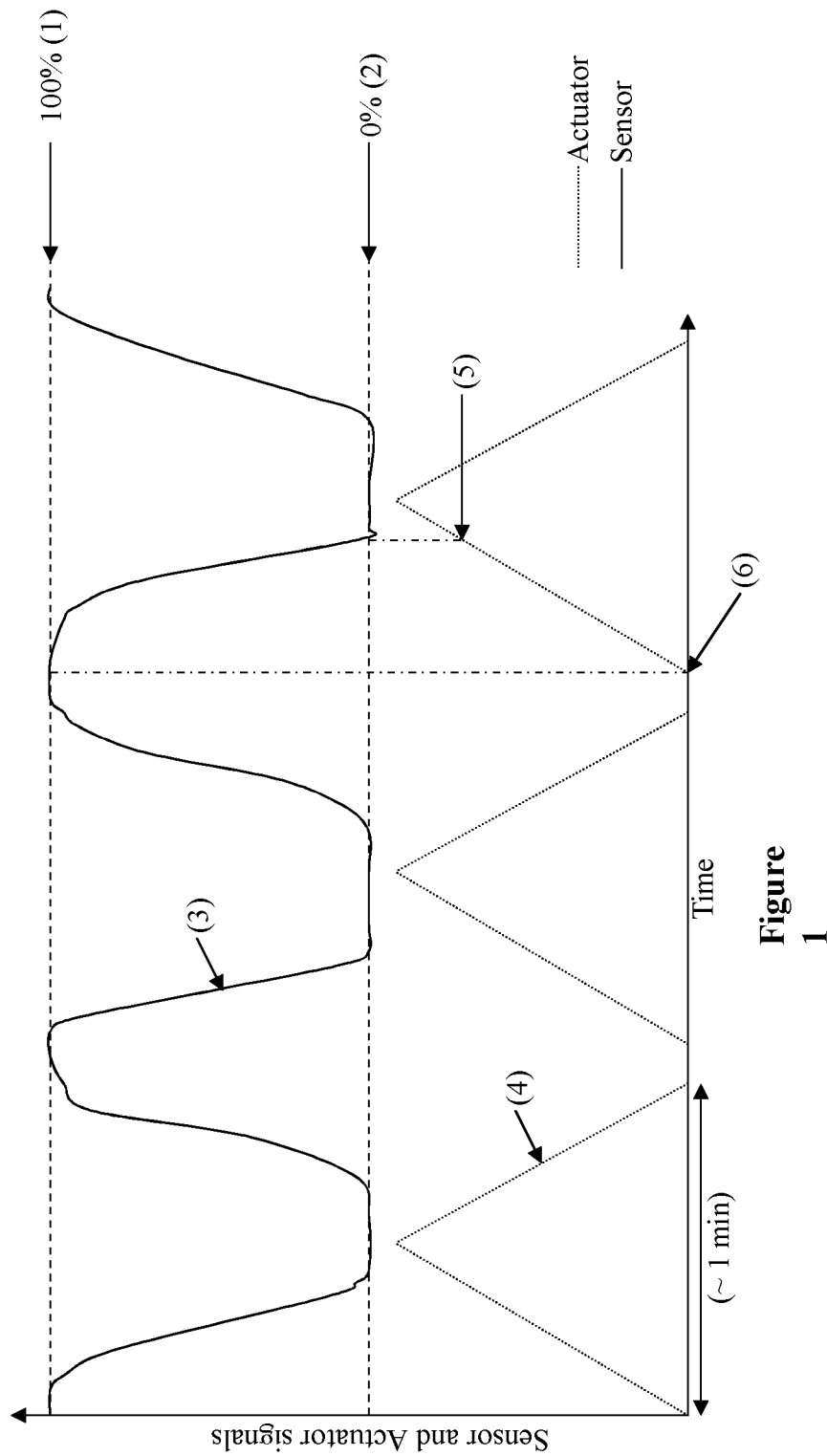
FIG. 1 is a schematic graph showing a sensor output for a ramped actuator input.

Referring now to the drawings:

FIG. 1 shows the actuator and sensor responses for the automatic sensor calibration procedure. A series of actuator ramps (4) (a period of 1 minute is used as an example although any length of period can be used) are performed and the sensor responses (3) are recorded. Three ramps are shown in FIG. 1 although the procedure can be performed with any number of ramps. The objective of the calibration procedure is to determine the maximum (1) and minimum (2) sensor levels. The maximum (1) and minimum (2) values could be of any mathematical formulation, for example as an integration of the highest or lowest values over a suitable time frame, or as an average. These values are automatically identified and recorded and, as an example, the sensor plots are scaled so that the maximum value (1) appears as 100% and the minimum value (2) appears as 0%. The actuator values that correspond to the maximum and minimum sensor values are points (5) and (6)—the window of operation of the controller. The auto-tuning procedure will then be performed at an actuator level that is in-between points (5) and (6). This actuator level will be referred to as $u_0$. It should be noted that FIG. 1 shows an inverse the relationship between actuator and sensor. The calibration and auto-tuning procedure described by the present invention is equally applicable to a process that has a direct relationship between actuator and sensor, or any other complex relationship between actuation and sensor signal. The pulses described in FIG. 1 are of triangular shape, however, it is possible to perform the calibration using any other suitable type of pulse.

Figure 2:
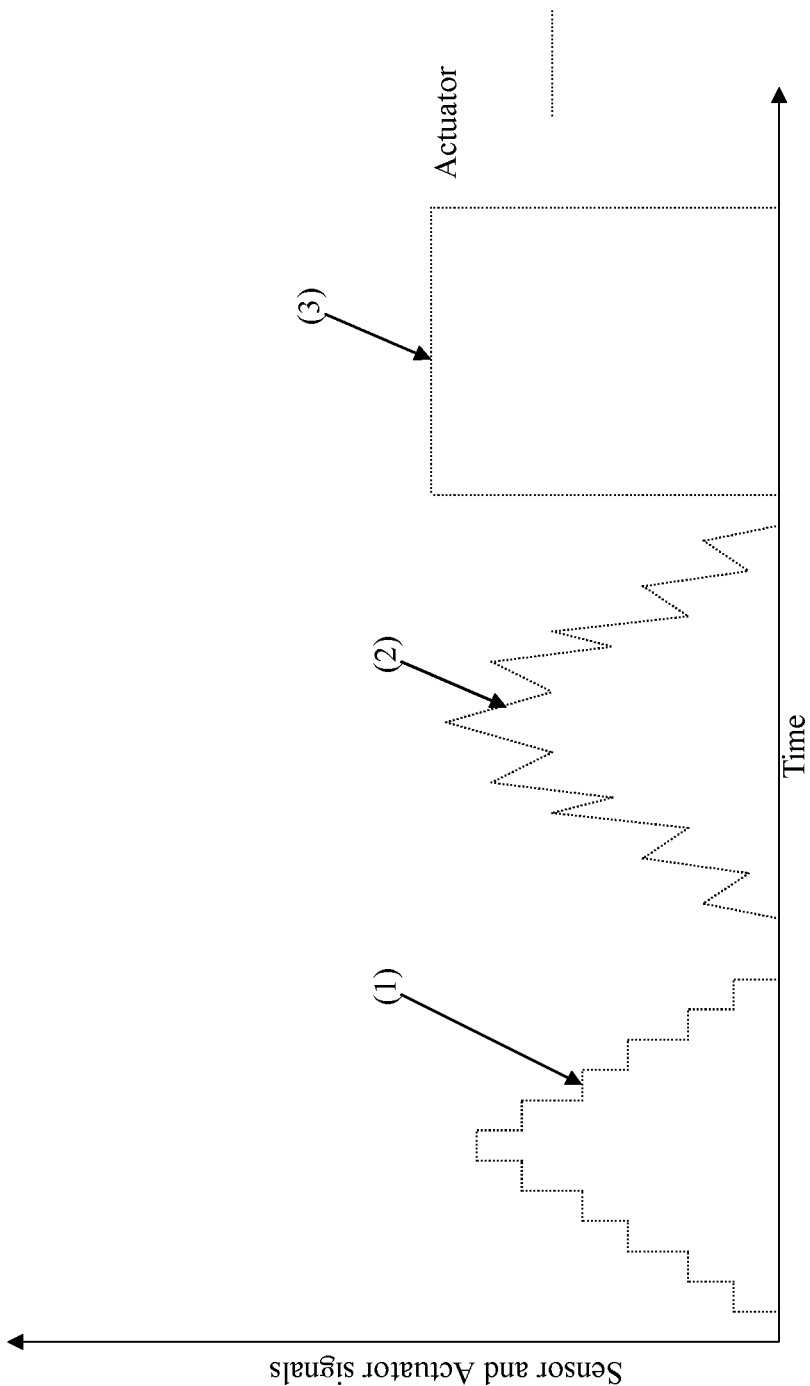
FIG. 2 illustrates various different ramp profiles that could be used in place of the triangular ramps of FIG. 1.

This is illustrated in FIG. 2 where different possible pulse types are shown e.g. square stepped pulses (1), saw tooth (2), square pulse (3), or any other type of pulse or combination of pulses and/or constant signal.

Figure 3:
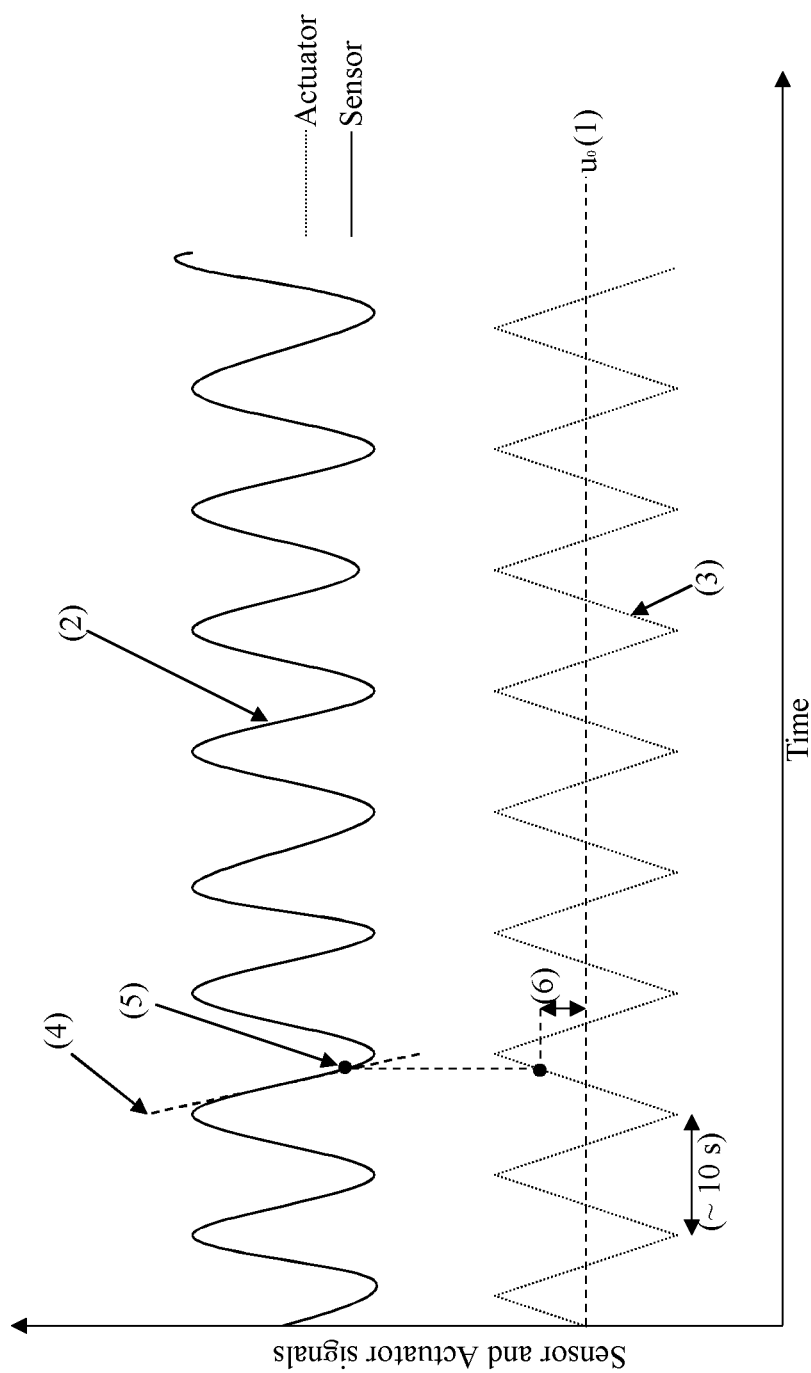
FIG. 3 is another schematic graph showing a sensor output for a ramped actuator input.
Figure 4:
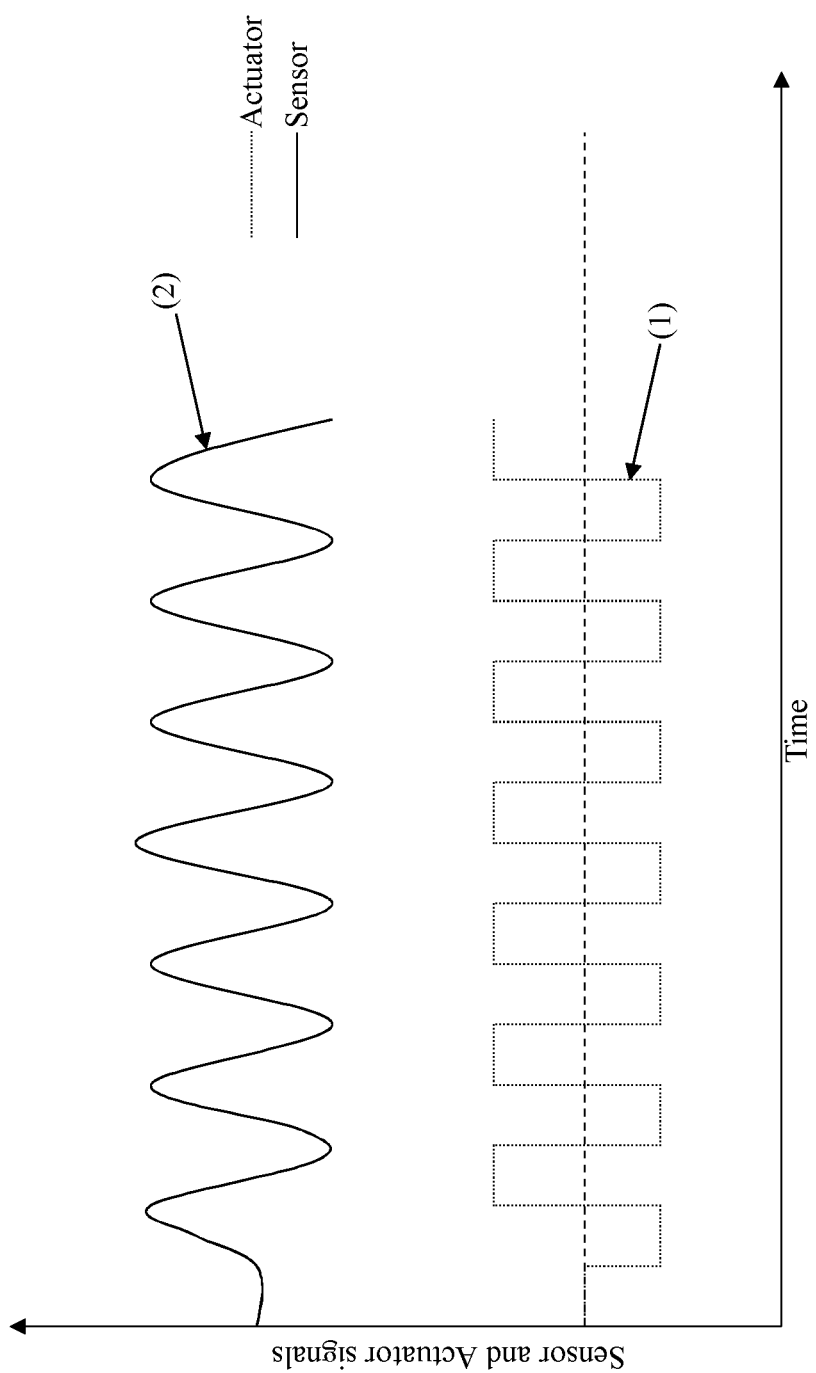
FIG. 4 is another schematic graph showing a sensor output for a ramped actuator input.

FIG. 3 shows actuator and sensor responses for the system identification procedure. An actuator pulse (3) is performed (with a period of approximately 10 seconds) about $u_0$ (1). The sensor response (2) is then analysed to determine information on the dynamic response characteristics of the system. For a given single sample point in time (5) the gradient of the sensor response, referred to as dy, is recorded (4). For the same sample point the corresponding actuator value is recorded and its difference from $u_0$, referred to as $\Delta u$, calculated (6). The system dynamic characteristic parameter, B, can then be calculated where $B=f(dy, \Delta u)$. The average value of B for all sample points is then calculated and recorded. FIG. 3 shows this process using a triangular pulse, however, the process is equally applicable using a square pulse as shown by FIG. 4 where (1) is the actuator pulse and (2) is the sensor response. The type of pulse, including pulse length and amplitude, may be automatically chosen depending on the type of sensor, system, actuator or process.

Figure 5:
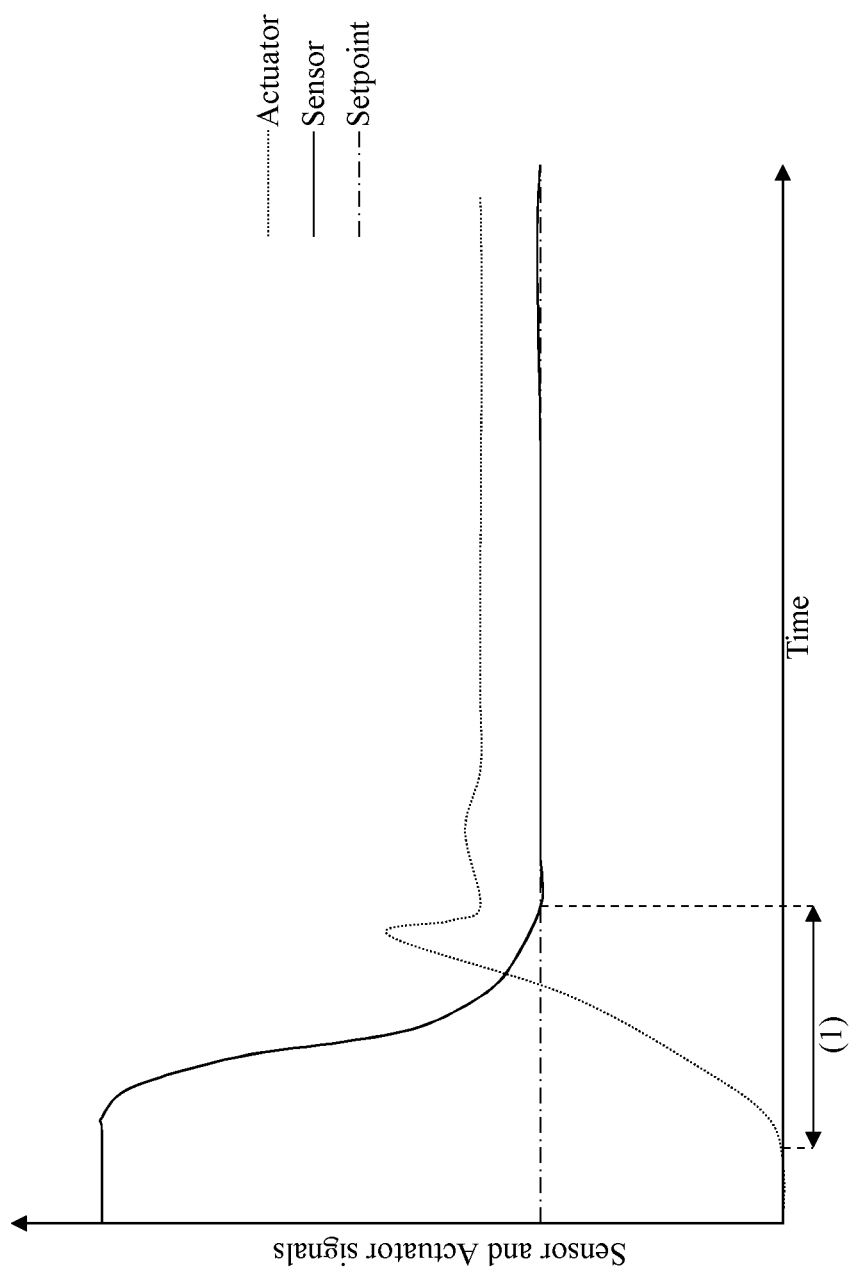
FIG. 5 is a schematic graph of a sensor output for a given actuator input, as they relate to a desired (setpoint) value.

The optimum controller parameters K are then calculated for a specified time to the setpoint (tts). The tts is given as the time from the onset of the initial control action to the point where the sensor to reaches the desired value (the setpoint). This is illustrated in FIG. 5 where the time to setpoint is shown by (1). A default tts is used for the initial controller parameter calculation. The default tts may differ depending of the type of sensor being used, e.g. optical emission, spectral CCD, voltage, partial pressure or Lambda sensor. The optimum controller parameters are calculated from the function $K=g(B, tts)$. The function g will differ depending on the control algorithm being used, e.g. PID or PDF.

Figure 6:
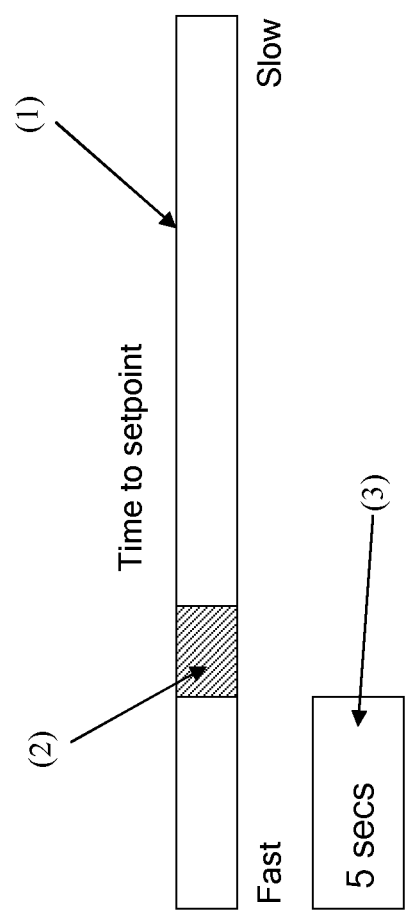
FIG. 6 is a schematic representation of a GUI for the invention.

FIG. 6 shows an example of the user interface for setting the time to setpoint of the present invention. The controller operator can either move a point (2) on a slider (1) to increase or decrease the time to setpoint or the time to setpoint can be entered directly in a text box (3). When the tts is changed the controller parameters are automatically re-calculated using function g. The user interface could take any numerical or graphic visual arrangement.

Figure 7:
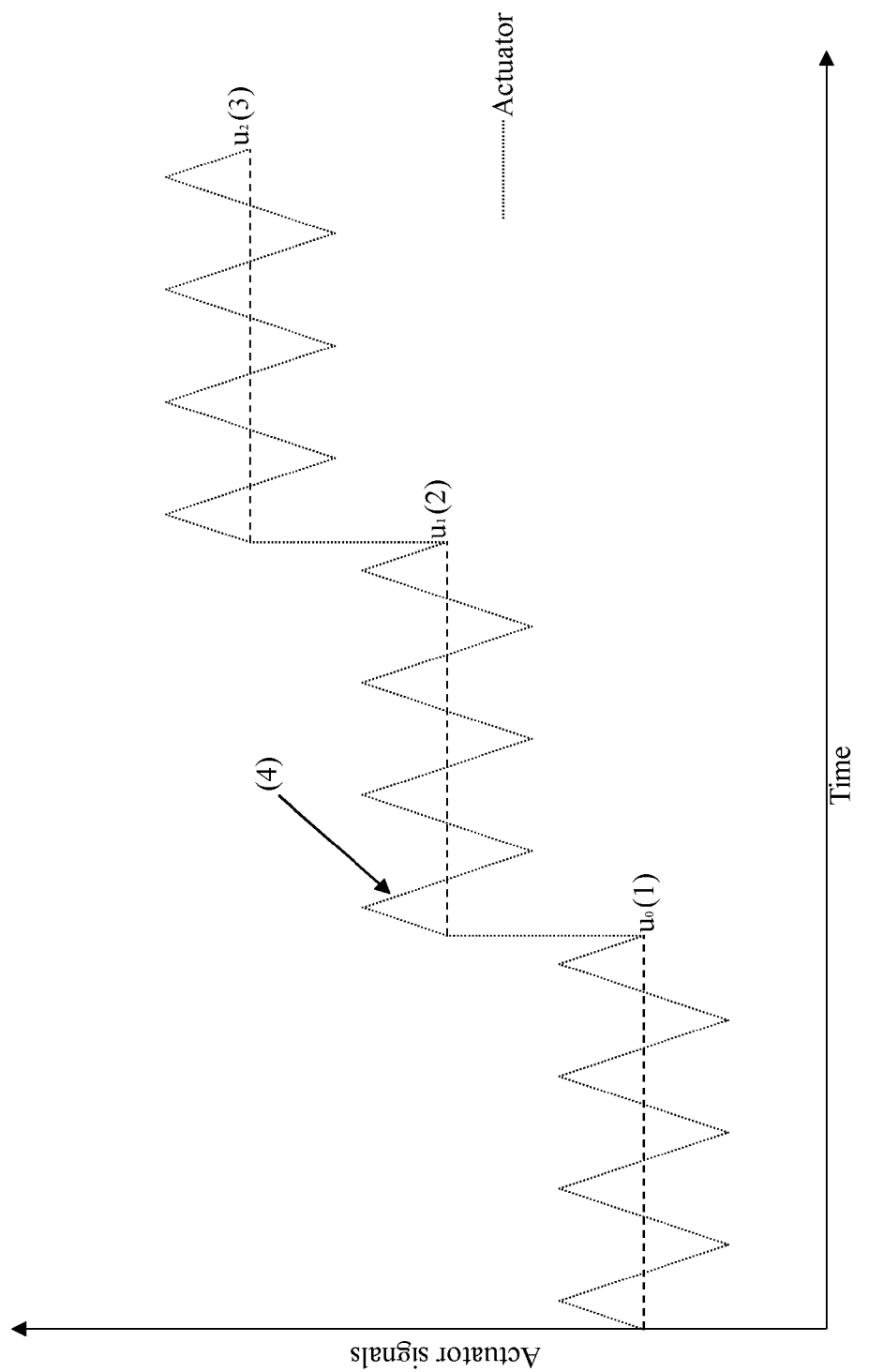
FIG. 7 is a schematic graph showing a three-stage actuator ramping profile.

FIG. 7 is an extension to the auto-tuning procedure described in the present invention where multiple sequential pulses at different mean amplitudes are used. In the illustration the actuator pulses (4) are shown to be performed at mean amplitude levels (1), (2) and (3). The optimum controller parameters can be calculated for these three levels which correspond to small, medium and large setpoint amplitudes. From this, optimum controller gains can be interpolated for a complete range of possible setpoints. The number of mean amplitude levels is not necessarily limited to three—increasing or decreasing the number of levels will increase or decrease the fidelity of the interpolation.

The invention claimed is:

1. A method of automatically calculating controller parameters to be applied in a system comprising a controller operatively connected to a sensor and an actuator, comprising:

automatically performing a series of actuator actions controlled by a controller;

determining, with a processor, a sensor response for the series of actuator actions, the sensor response being based on an actuator input;

performing, with the processor, an automatic sensor calibration procedure to determine a window of operation for the controller between a determined maximum sensor level and a determined minimum sensor level, the automatic sensor calibration procedure comprising:

performing a series of first actuator ramps as a first actuator ramping and recording first sensor responses;

determining a maximum sensor value and a minimum sensor value recoded during the first actuator ramping;

recording an actuator value corresponding to the minimum sensor value;

recording an actuator value corresponding to the maximum sensor value;

determining the window of operation of the controller to be a range of actuator values falling between the actuator value corresponding to the minimum sensor value and the actuator value corresponding to the maximum sensor value;

performing, with the processor, a system identification procedure for determining information on dynamics of the system to be controlled, the performing the system identification procedure comprising:

selecting an actuator value u0 falling within the window of operation of the controller;

performing a second actuator ramping about the selected actuator value u0;

analysing the sensor response by recording the gradient of the sensor response dy/dt at an actuator value $\Delta u$ offset from u0; and determining a relationship B that is characteristic of a dynamic system parameter according to a relationship B=f(dy/dt, Δu);

automatically calculating, with the processor, controller parameters to achieve a specified dynamic response based on the calibration and system identification procedures; and applying, with the processor, the controller parameters to the controller to achieve the specified dynamic response.

2. The method of claim 1, further comprising determining an average value for B for a plurality of the actuator values Δu offset from the selected actuator value u0.

3. The method of claim 1, further comprising calculating optimum controller parameters K of the controller parameters for a specified time to a setpoint tts, the time to the setpoint tts being a time from the onset of an initial actuator input to a point the sensor output reaches the setpoint.

4. The method of claim 3, wherein:
initially, a default time to the setpoint tts value is used, and
after having performed the method, the optimum controller parameters K are calculated by the function K=g(B, tts).

5. The method of claim 4, wherein:
the function g is selected according to a control algorithm used by the controller, and
the control algorithm comprises at least one algorithm selected from a group consisting of: a proportional P control algorithm; a proportional integrating PI control algorithm; a proportional-integral-derivative PID control algorithm, and a proportional-derivative-feedback PDF control algorithm.

6. The method of claim 1, wherein a period of the first actuator ramping is substantially 1 minute.

7. The method of claim 1, wherein a period of the second actuator ramping is approximately 10 seconds.

8. The method of claim 1, wherein the maximum sensor value and the minimum sensor value are obtained by one of integrating or averaging highest or lowest sensor values recorded in an interval of time.

9. The method of claim 1, wherein:
the maximum sensor value and the minimum sensor value are automatically identified and recorded, and
the maximum sensor value and the minimum sensor value are scaled such that the maximum sensor value is represented as a 100% sensor value and the minimum sensor value is represented as 0% sensor value.

10. The method of claim 1, wherein at least one of the first actuator ramping and the second actuator ramping is executed according to a signal scheme selected from a group consisting of: triangular pulses; square stepped pulses; saw toothed pulses; square pulses; and a constant signal.

11. The method of claim 3, wherein:
the second actuator ramping comprises ramping using a series of sequential pulses at different mean amplitudes, the optimum controller parameters K are calculated for the different mean amplitudes, and
the controller is configured to interpolate optimum controller gains for a range of possible setpoints.

12. The method of claim 1, wherein a pulse duration and amplitude is automatically selected depending on a type of at least one of a sensor, system, actuator or process.

13. The method claim 1, the controller controlling a process that implements steps of a method selected from a group consisting of: a plasma deposition treatment method; a non-plasma deposition and treatment method; a plasma vacuum method; a reactive magnetron sputtering method; a non-reactive magnetron sputtering method; a plasma assisted chemical vapour deposition method; a cathodic arc ion assisted deposition method; a high-power impulse magnetron sputtering (HIPIMS) method; and a coating or deposition method.

14. The method of claim 13, wherein the controller is adapted to regulate a rate, composition and uniformity of deposition.

15. The method of claim 14, wherein the actuator is configured to control at least one process parameter selected from a group consisting of: a flow of a process gas; a voltage; a current; a voltage frequency; a voltage amplitude; a current frequency; a current amplitude; a fluid injection flow rate; a chemical injection; a particle injection; an operation of an electric motor; an operation of a linear actuator; an operation of a pneumatic actuator and an operation of a valve.

16. The method of claim 14, wherein the sensor is configured to measure the rate of deposition.

17. The method of claim 16, the sensor being selected from a group consisting of: a target voltage sensor; a plasma light emission sensor; a pressure sensor; an oxygen partial pressure sensor; a hydrogen sensor; an optical emission sensor; a spectral CCD; a partial pressure sensor; and a Lambda sensor.

18. The method of claim 13, further comprising receiving, via a graphical user interface for the controller, a user input to set a time to setpoint, the graphical user interface comprising a slider or text input box for user-selection of a desired time to setpoint, and when the desired time to setpoint is changed, the controller parameters are automatically re-calculated using function g.

19. The method of claim 1, wherein a system controlled by the controller is selected from a group consisting of: a power generation apparatus; a wind turbine; a hydroelectric turbine; a tidal current turbine; a motor that when actuated intervenes in electrical power generation; a power conversion system; an aerodynamic system; an energy grid; an energy management system; a photovoltaic energy production and management system; and an energy storage system.

* * * * *